United States Patent [19]

Valyocsik

[11] Patent Number: 4,592,902

[45] Date of Patent: Jun. 3, 1986

[54] SYNTHESIS OF CRYSTALLINE SILICATE ZSM-5 WITH AN ALKYLTROPINIUM COMPOUND PROMOTER

[75] Inventor: Ernest W. Valyocsik, Yardley, Pa.

[73] Assignee: Mobil Oil Corporation, New York, N.Y.

[21] Appl. No.: 705,819

[22] Filed: Feb. 26, 1985

[51] Int. Cl.⁴ .............................................. C01B 33/28
[52] U.S. Cl. .................................. 423/328; 423/329; 502/62; 502/77
[58] Field of Search .............................. 423/326–333; 502/60, 62, 71, 77

[56] References Cited

U.S. PATENT DOCUMENTS

| | | | |
|---|---|---|---|
| 3,702,886 | 11/1972 | Argauer et al. ...................... | 423/328 |
| 4,139,600 | 2/1979 | Rollmann et al. ................... | 423/329 |
| 4,175,114 | 11/1979 | Plank et al. ......................... | 423/329 |
| 4,427,787 | 1/1984 | Miale et al. ..................... | 423/328 X |
| 4,483,835 | 11/1984 | Zones ............................... | 423/329 X |
| 4,526,767 | 7/1985 | Robinson et al. ................... | 423/329 |

OTHER PUBLICATIONS

Lok et al., "Zeolites", vol. 3, 1983, pp. 282–291.

*Primary Examiner*—Edward J. Meros
*Attorney, Agent, or Firm*—Alexander J. McKillop; Michael G. Gilman; Dennis P. Santini

[57] ABSTRACT

There is provided a method and a reaction mixture for preparing crystalline silicate having the structure of ZSM-5 with an alkyltropinium directing agent, alkyl being of 2 to 5 carbon atoms.

21 Claims, No Drawings

SYNTHESIS OF CRYSTALLINE SILICATE ZSM-5 WITH AN ALKYLTROPINIUM COMPOUND PROMOTER

BACKGROUND

This invention relates to a method for preparing ZSM-5 with an alkyltropinium compound promoter, the alkyl being of 2 to 5 carbon atoms.

ZSM-5 is a crystalline silicate having a silica/alumina mole ratio of at least 5/1 and a distinctive X-ray diffraction. ZSM-5 and a method for its preparation are described in U.S. Pat. No. 3,702,886, the entire disclosure of which is expressly incorporated herein by reference. Tetraalkylammonium ions are described as being suitable promoters or templating agents in the method set forth in U.S. Pat. No. 3,702,886.

Another method for making ZSM-5 using an alkyldiamine promoter is described in U.S. Pat. No. 4,139,600.

SUMMARY

According to one aspect of the invention, there is provided a method for preparing ZSM-5, which comprises preparing a mixture capable of forming said ZSM-5, said mixture containing sufficient sources of an alkali metal ion, an oxide of silicon, water, optionally an oxide of aluminum, and an alkyltropinium compound having the formula

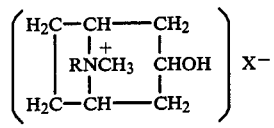

wherein R is alkyl of 2 to 5 carbon atoms and X is an anion selected from the group consisting of halide (e.g., iodide, chloride or bromide), hydroxide, nitrate, sulfate, perchlorate and bisulfate, said method further comprising maintaining said mixture under sufficient crystallization conditions until crystals of said ZSM-5 are formed.

According to another aspect of the invention, there is provided a reaction mixture for preparing ZSM-5 by this method. Alkyltropinium ZSM-5 is also provided.

EMBODIMENTS

Zeolite ZSM-5 possesses a definite distinguishing crystalline structure whose X-ray diffraction pattern shows the following significant lines:

TABLE 1

| Interplanar Spacing d(A) | Relative Intensity |
| --- | --- |
| 11.1 ± 0.3 | S |
| 10.0 ± 0.3 | S |
| 7.4 ± 0.2 | W |
| 7.1 ± 0.2 | W |
| 6.3 ± 0.2 | W |
| 6.04 ± 0.2 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.04 ± 0.03 | W |
| 2.99 ± 0.02 | W |

TABLE 1-continued

| Interplanar Spacing d(A) | Relative Intensity |
| --- | --- |
| 2.94 ± 0.02 | W |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, $100I/I_o$ where $I_o$ is the intensity of the strongest line or peak, and d (obs.), the interplanar spacing in A, corresponding to the recorded lines, were calculated. In Table 1 the relative intensities are given in terms of the symbols W=weak, S=strong and VS=very strong. It should be understood that this X-ray diffraction pattern is characteristic of all the species of ZSM-5 zeolites. Ion exchange of the sodium ions with cations reveals substantially the same pattern with some minor shifts in interplanar spacing and variation in relative intensity. Other minor variations can occur depending on the silicon to aluminum ratio of the particular sample, as well as if it has been subjected to thermal treatment.

In the present method for preparing a ZSM-5 crystalline silicate, a reaction mixture is prepared comprising sources of alkali metal, an oxide of aluminum, if desired, an oxide of silicon, organic nitrogen-containing cations, and water. The reaction mixture has the following composition, expressed in terms of mole ratios of oxides:

|  | Broad | Preferred | Particularly Preferred |
| --- | --- | --- | --- |
| $SiO_2/Al_2O_3 =$ | 20–20,000 | 30–10,000 | 60–5,000 |
| $H_2O/SiO_2 =$ | 5–200 | 10–100 | 20–60 |
| $OH^-/SiO_2 =$ | 0.001–2.0 | 0.01–1.0 | 0.1–0.5 |
| $M/SiO_2 =$ | 0.005–4.0 | 0.01–2.0 | 0.05–1.0 |
| $R'/SiO_2 =$ | 0.01–3.0 | 0.05–1.5 | 0.1–0.6 | wherein M is the alkali metal cation and R' is alkyltropinum where alkyl is branched or linear and of 2 to 5 carbon atoms, e.g., ethyltropinium, propyltropinium, butyltropinium or pentyltropinium.

The reaction mixture is maintained under sufficient crystallization conditions until crystals of ZSM-5 are formed. More particularly, the reaction mixture may be maintained at a temperature of from about 40° C. to about 200° C. for a period of time of from about 3 hours to about 180 days until crystals of ZSM-5 are formed. A more preferred temperature range is from about 100° C. to about 180° C. for a period of time at a temperature within such preferred range being from about 3 hours to about 30 days.

It is recalled that in calculating the mole ratio of hydroxide ions/silica, it is conventional to calculate hydroxide by summing moles of $OH^-$, whether added as NaOH, as quaternary ammonium hydroxide (in the case of a conventional preparation), as sodium silicate ($NaOH + SiO_2$), as sodium aluminate ($NaOH + Al_2O_3$, or the like and to subtract from that sum any moles of acid added. Acid may be added simply as HCl, $NHO_3$, $H_2SO_4$, acetic acid, and the like or it may be added as an aluminum sulfate ($Al_2O_3 + H_2SO_4$), chloride ($Al_2O_3 + HCl$), nitrate ($Al_2O_3 + HNO_3$), etc. Each mole of $Al_2O_3$ is itself equivalent to 2 moles of acid in this calculation, since $Al_2O_3$ consumes 2 moles of hydroxide in its conversion to framework aluminate ion. In particular, no contribution is assigned to organic bases in this calculation. Organic bases present in reaction mixture having an $OH^-/SiO_2$ ratio of 0.01 are protonated when further acid is added. Until said additional acid exceeds the organic base present, the pH remains above 7.

In a conventional calculation, which does not consider organic base, the total moles of acid could thereby exceed the moles of hydroxide initially present in said reaction mixture and subtraction would thereby lead to apparent "negative" $OH^-/SiO_2$ ratios. A negative ratio is, of course, not possible since the true moles of hydroxide (per liter) in an aqueous mixture are always positive and equal to $10^{-14}$ divided by the moles per liter of acid.

For convenience, and to maintain the conventions established in describing reaction mixture compositions, we define a ratio of $H^+(additional)/SiO_2$, which is equal to the moles of $H^+$ added in excess of the moles $OH^-$ added in preparing the reaction mixture.

The digestion of the gel particles is carried out until crystals form. The solid product is separated from the reaction medium, as by cooling the whole to room temperature, filtering and water washing.

The composition for the synthesis of synthetic ZSM-5 can be prepared utilizing materials which can supply the appropriate oxide. Such materials include aluminates, alumina, silicates, silica hydrosol, silica gel, silicic acid and hydroxides. It will be understood that each oxide component utilized in the reaction mixture for preparing ZSM-5 can be supplied by one or more essential reactants and they can be mixed together in any order. For example, any oxide can be supplied by an aqueous solution, sodium hydroxide or by an aqueous solution of a suitable silicate; the organic nitrogen-containing cation can be supplied by a suitable compound of that cation, such as, for example, a halide salt. The reaction mixture can be prepared either batchwise or continuously. Crystal size and crystallization time of the ZSM-5 composition will vary with the nature of the reaction mixture employed.

The ZSM-5 composition as prepared hereby has the characteristic X-ray diffraction pattern of conventionally prepared ZSM-5, the values of which are set forth in Table 1.

The original cations, e.g., alkali metal, of the as synthesized ZSM-5 can be replaced in accordance with techniques well known in the art, at least in part, by ion exchange with other cations. Preferred replacing cations include metal ions, ammonium ions, hydrogen ions and mixtures thereof. Particularly preferred cations are those which render the zeolite catalytically active especially for hydrocarbon conversions. These include hydrogen, hydrogen precursors, rare earth metals, and metals of Groups IIA, IIIA, IVA, IB, IIB, IIIB, IVB, VIB and VIII of the Periodic Table. Of the replacing metallic cations, particular preference is given to cations of metals such as rare earth, Mn, Ca, Mg, Zn, Cd, Pd, Pt, Ni, Co, Ti, Al, Sn, Fe and Cu.

A typical ion exchange technique would be to contact the synthetic ZSM-5 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from about 65° C. to about 315° C., and thereafter may be calcined in air or inert gas at temperatures ranging from about 260° C. to about 900° C. for periods of time ranging from 1 to 48 hours or more to produce a catalytically-active thermal decomposition product thereof.

Regardless of the cation replacing the cations in the synthesized form of the ZSM-5, the spatial arrangement of the aluminum, silicon and oxygen atoms which form the basic crystal lattices of ZSM-5 remains essentially unchanged by the described replacement of the original cations as determined by taking an X-ray powder diffraction pattern of the ion-exchanged material.

The alkyltropinium compounds useful as directing agent in the present invention are synthesized by alkylation selectively at the bridgehead nitrogen of the starting material compound, i.e., tropine, or endo-8-methyl-8-azabicyclo [3.2.1] octan-3-ol, in a suitable solvent.

The synthesis method utilized for preparation of the directing agent compounds for this invention involves contacting tropine with an appropriate alkylating agent in a suitable solvent medium at reaction conditions including a temperature of from about ambient to reflux, and a pressure of from atmospheric to about 500 psig, preferably about atmospheric. The time required for the reaction will, of course, depend upon such factors as temperature and pressure, as well as relative concentrations of reactants and desired degree of reaction, but usually will be from about 6 hours to about 4 days.

The reflux temperature of reaction limitation will depend upon the amount and nature of solvent used. Generally, the reaction mixture will comprise from about 5 to about 20 weight percent tropine, from about 10 to about 20 weight percent alkylating agent and from about 60 to about 85 weight percent solvent.

A suitable solvent, preferably polar, may be used in the reaction. Such solvents include an alcohol of from 1 to about 8 carbon atoms, ether of from 2 to about 10 carbon atoms, or combinations thereof, especially methanol, ethanol, acetone and/or diethyl ether. The tropine must be soluble in the solvent chosen to at least about 20 percent. The preferred solvent will be essentially water-free, as will the reaction mixture in which the directing agent compounds are produced. Choice of solvent will determine to a substantial degree the reflux temperature limitation at which the reaction will proceed to a desired product. For example, a solvent of ethanol will determine reflux temperature of about 70° C. Methanol solvent will establish the reflux temperature at about 65° C.

The alkylating agents may be olefins such as, for example, ethylene, propylene, butene, pentene, as well as alkyl halides and alcohols, the alkyl portion thereof having from 2 to 5 carbon atoms. Other acyclic compounds able to provide at least one reactive $C_2$ to $C_5$ alkyl radical may be utilized as alkylating agents.

The preferred alkylating agents are alkyl halides of from 2 to about 5 carbon atoms, especially the chloride, bromide or iodide. When an alkyl halide is used, the halide moiety will be the anion of the alkyltropinium compound.

The hereby prepared zeolite ZSM-5 may be used in a wide variety of organic compound, e.g. hydrocarbon compound and oxygenate such as methanol and/or ether, conversion processes. Such processes include, for example, alkylation of aromatics with olefins, aromatization of normally gaseous olefins and paraffins, aromatization of normally liquid low molecular weight paraffins and olefins, isomerization of aromatics such as xylenes, isomerization of paraffins and olefins, transalkylation of aromatics, oligomerization of olefins and cracking and hydrocracking. All the foregoing catalytic processes are of value since they result in upgrading of the organic charge being processed.

Synthetic ZSM-5 zeolites prepared in accordance hereto can be used either in the alkyltropinium or alkali metal form and hydrogen form or another univalent or multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-5 such as, for example, by, in the case of platinum, treating the zeolite with a platinum metal-containing ion. Thus, suitable platinum compounds for this purpose include chloroplatinic acid, platinous chloride and various compounds containing the platinum amine complex. Combinations of metals and methods for their introduction can also be used.

The ZSM-5 prepared by the instant invention is formed in a wide variety of particle sizes. Generally speaking, the particles can be in the form of a powder, a granule, or a molded product, such as extrudate having particle size sufficient to pass through a mesh (Tyler) screen and be retained on a 400 mesh (Tyler) screen. In cases where the catalyst is molded, such as by extrusion, the ZSM-5 can be extruded before drying or dried or partially dried and then extruded.

In the case of many catalysts, it is desired to incorporate the ZSM-5 hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g., alumina. The latter may be either naturally occurring or in the form of gelatinous precipitates, sols or gels including mixtures of silica and metal oxides. Use of a material in conjunction with the ZSM-5, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized ZSM-5 catalyst include the montmorillonite and kaolin families, which families include the sub-bentonites and the kaolines commonly known as Dixie, McNammee, Georgia and Florida clays or others in which the main mineral constituent is halloysite, kaolinite, dickite, nacrite, or anauxite. Such clays can be used in the raw state or initially subjected to calcination, acid treatement or chemical modification.

In addition to the foregoing materials, the ZSM-5 catalyst hereby synthesized can be composited with a porous matrix material such as silica-alumina, silica-magnesia, silica-zirconia, silica thoria, silica-beryllia, silica-alumina-thoria, silica-alumina-zirconia, silica-alumina-magnesia and silica-magnesia-zirconia. The matrix can be in the form of a coqel. A mixture of these components could also be used. The relative proportions of finely divided crystalline ZSM-5 and inorganic oxide gel matrix vary widely with the crystalline ZSM-5 content ranging from about 1 to about 90 percent by weight, and more usually in the range of about 2 to about 50 percent by weight of the composite.

In employing the ZSM-5 catalyst of this invention for polymerization of olefin-containing liquid or gaseous charge stocks, such charge stocks can be polymerized at temperatures from about 250° C. to about 460° C. at a weight hourly space velocity of from about 0.5 hr$^{-1}$ to about 50 hr$^{-1}$ and a pressure of from about 0.1 to about 800 psig.

In employing the catalyst of the present invention for aromatization of gaseous or liquid charge stocks which may be olefinic or paraffinic, with or without aromatics present, such stocks can be aromatized at temperatures of from about 425° C. to about 650° C., pressures from about 1 to about 10 atmospheres and weight hourly space velocities of from about 0.1 to about 10 hr$^{-1}$.

The ZSM-5 prepared by the method of the present invention preferably has a SiO$_2$/Al$_2$O$_3$ molar ratio of from about 15 to 100,000.

In order to more fully illustrate the nature of the invention and the manner of practicing same, the following examples are presented.

EXAMPLES 1-4

Alkyltropinium compounds, e.g., halides, were prepared by reacting tropine with an appropriate alkyl halide in absolute ethanol solvent according to the reaction,

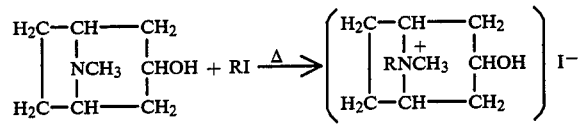

where R was individually ethyl, propyl, butyl and pentyl.

The reaction mixture was generally refluxed for 1–3 days before quenching the reaction vessel in a dry ice-acetone bath to −20° C. The crystalline product was separated from the solvent and filtered on a Büchner funnel. The crystals were dried in an air stream, then chemically analyzed. Table 2 records the analytical results for the series of alkyltropinium halides synthesized in these examples.

TABLE 2

| Example | Product Compound | Composition wt % | | | | |
|---|---|---|---|---|---|---|
| | | C | H | N | O | I |
| 1 | Ethyltropinium | 40.38 | 6.81 | 4.58 | 5.2 | 42.38 |

TABLE 2-continued

| Example | Product Compound | Composition wt % | | | | |
|---|---|---|---|---|---|---|
| | | C | H | N | O | I |
| | Iodide | | | | | |
| 2 | Propyltropinium Iodide | 42.16 | 6.99 | 4.41 | 5.1 | 40.50 |
| 3 | Butyltropinium Iodide | 44.27 | 7.58 | 4.63 | 3.9 | 39.58 |
| 4 | Pentyltropinium Iodide | 44.90 | 7.71 | 4.12 | 5.8 | 37.47 |

EXAMPLES 5–12

Eight separate synthesis mixtures were prepared with compositions indicated in Table 3. The mixtures were prepared with silica sol (30% $SiO_2$), $NaAlO_2$, NaOH, water an an alkyltropinium iodide, where the alkyl group was, individually, ethyl, n-propyl, n-butyl and n-pentyl (as synthesized in Examples 1–4). The mixtures were maintained at 160° C. for 4 days in a stirred (400 rpm) stainless steel autoclave at autogenous pressure. At the termination of the synthesis (4 days in each), the solids were separated from unreacted components by filtration, water washed, then dried at 110° C. The solid products were analyzed by x-ray diffraction and chemical analysis. The solid crystalline silicate products of Examples 5–12 were proven to be of zeolite ZSM-5 structure to have the x-ray pattern of Table 1, hereinabove, of varying crystallinity, as recorded in Table 3. The product of Example 8 also contained α-quartz.

Results of chemical analyses are presented in Table 4.

TABLE 3

| Example | Directing Agent* | Mixture Composition (mole ratios) | | | | | Product Crystallinity |
|---|---|---|---|---|---|---|---|
| | | $SiO_2/Al_2O_3$ | $H_2O/SiO_2$ | $OH^-/SiO_2$ | $Na^+/SiO_2$ | $R^{1**}/SiO_2$ | |
| 5 | Ethyltropinium | 60 | 40 | 0.30 | 0.33 | 0.20 | 75% |
| 6 | n-Propyltropinium | 70 | 40 | 0.30 | 0.33 | 0.23 | 70% |
| 7 | n-Propyltropinium | 90 | 40 | 0.30 | 0.32 | 0.20 | 75% |
| 8 | n-Propyltropinium | 200 | 40 | 0.30 | 0.31 | 0.20 | 70% |
| 9 | n-Butyltropinium | 60 | 40 | 0.30 | 0.33 | 0.15 | 90% |
| 10 | n-Butyltropinium | 180 | 40 | 0.30 | 0.31 | 0.15 | 100% |
| 11 | n-Pentyltropinium | 90 | 40 | 0.30 | 0.32 | 0.15 | 50% |
| 12 | n-Pentyltropinium | 180 | 40 | 0.30 | 0.31 | 0.15 | 80% |

*Iodide Salt
**$R^1$ = The alkyltropinium cation

TABLE 4

| Example | Moles C/ Mole N | Moles per Mole $Al_2O_3$ | | |
|---|---|---|---|---|
| | | $N_2O$ | $Na_2O$ | $SiO_2$ |
| 5 | 12.4 | 1.0 | n.d. | 61 |
| 6 | 11.4 | 1.4 | 0.10 | 66 |
| 7 | 11.4 | 1.7 | n.d. | 83 |
| 8 | 11.6 | 2.9 | 0.28 | 195 |
| 9 | 12.9 | 1.2 | 0.46 | 60 |
| 10 | 12.9 | 3.3 | 1.0 | 198 |
| 11 | 14.0 | 1.4 | 1.4 | 97 |
| 12 | 13.8 | 3.0 | 0.83 | 186 |

EXAMPLE 13

For comparison purposes, methyltropinium halide, i.e., iodide, was prepared as in Examples 1–4, with R being methyl provided by methyliodide. The solvent was also absolute ethanol. The methyltropinium iodide synthesized was determined to be composed of 38.33 wt %C, 6.51 wt %H, 4.87 wt %N, 5.6 wt %O and 44.74 wt %I.

A synthesis reaction mixture was prepared as in Examples 5-12 with silica sol (30% $SiO_2$), $NaAlO_2$, NaOH, water and the methyltropinium iodide as directing agent. The mixture composition in mole ratios was:

$SiO_2/Al_2O_3 = 90$
$H_2O/SiO_2 = 40$
$OH^-/SiO_2 = 0.30$
$Na^+/SiO_2 = 0.32$
$R/SiO_2 = 0.25$ wherein R is the methyltropinium cation.

This mixture was maintained at 160° C. for 4 days in a stainless steel, stirred (400 rpm) autoclave at autogenous pressure. Solids were separated from unreacted components by filtration and then water washed, followed by drying at 110° C. The product crystals were analyzed by X-ray diffraction and chemical analysis. The product was found to be a crystalline silicate having an X-ray diffraction pattern different from that of ZSM-5, i.e., different from that shown in Table 1, hereinbefore.

What is claimed is:

1. A method for preparing a crystalline silicate ZSM-5 exhibiting a characteristic X-ray diffraction pattern as shown in Table 1 of the specification, which comprises (i) preparing a mixture capable of forming said crystalline silicate, said mixture comprising sources of alkali metal cations (M), an oxide of silicon, water and alkyltropinium cations (R') having the formula:

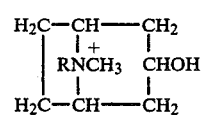

wherein R is alkyl of 2 to 5 carbon atoms, said mixture having a composition, in terms of mole ratios, within the following ranges:

$SiO_2/Al_2O_3 = 20-20,000$
$H_2O/SiO_2 = 5-200$
$OH^-/SiO_2 = 0.001-2.0$
$M/SiO_2 = 0.005-4.0$
$R'/SiO_2 = 0.01-3.0$, (ii) maintaining the mixture at a temperature of at least 40° C. until crystals of said crystalline silicate are formed and (iii) recovering said crystalline silicate from step (ii), said recovered crystalline silicate containing alkali metal and said alkyltropinium cations.

2. A method according to claim 1 wherein M is sodium.

3. A method according to claim 1 wherein said mixture has a composition, expressed in terms of mole ratios, within the following ranges:

$SiO_2/Al_2O_3 = 30-10,000$
$H_2O/SiO_2 = 10-100$

OH⁻/SiO₂=0.01–1.0
M/SiO₂=0.01–2.0
R'/SiO₂=0.05–1.5

4. A method according to claim 3 wherein M is sodium.

5. A method according to claim 1 wherein said mixture has a composition, expressed in terms of mole ratios, within the following ranges:

SiO₂/Al₂O₃=60–5,000
H₂O/SiO₂=20–60
OH⁻/SiO₂=0.1–0.5
M/SiO₂=0.05–1.0
R'/SiO₂=0.1–0.6

6. A method according to claim 5 wherein M is sodium.

7. A method according to claim 1 comprising replacing alkali metal cations of the crystalline silicate recovered in step (iii), at least in part, by ion exchange with a cation or a mixture of cations selected from the group consisting of hydrogen and hydrogen precursors, rate earth metals, and metals from Groups IIA, IIIA, IVA, IB, IIB, IIIB, IVB, VIB and VIII of the Periodic Table of Elements.

8. A method according to claim 7 wherein said replacing cation is hydrogen or a hydrogen precursor.

9. The recovered crystalline silicate ZSM-5 product of claim 1.

10. The recovered crystalline silicate ZSM-5 product of claim 2.

11. The recovered crystalline silicate ZSM-5 product of claim 3.

12. The recovered crystalline silicate ZSM-5 product of claim 4.

13. The recovered crystalline silicate ZSM-5 product of claim 5.

14. The recovered crystalline silicate ZSM-5 product of claim 6.

15. The alkyltropinium cation-containing crystalline silicate ZSM-5 product of claim 7.

16. The alkyltropinium cation-containing crystalline silicate ZSM-5 product of claim 8.

17. Alkyltropinium cation-containing Silicate ZSM-5, alkyl being ethyl, propyl, butyl or pentyl.

18. A reaction mixture capable of forming a crystalline silicate ZSM-5 exhibiting a characteristic X-ray diffraction pattern as shown in Table 1 of the specification, said mixture comprising sources of alkali metal cations (M), an oxide of silicon, water and alkyltropinium cations (R') having the formula:

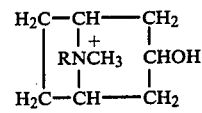

wherein R is alkyl of 2 to 5 carbon atoms, said mixture having a composition, in terms of mole ratios, within the following ranges:

SiO₂/Al₂O₃=20–20,000
H₂O/SiO₂=5–200
OH⁻/SiO₂=0.001–2.0
M/SiO₂=0.005–4.0
R'/SiO₂=0.01–3.0.

19. A reaction mixture according to claim 18 wherein M is sodium.

20. A reaction mixture according to claim 18 wherein said mixture has a composition, expressed in terms of mole ratios, within the following ranges:

SiO₂/Al₂O₃=30–10,000
H₂O/SiO₂=10–100
OH⁻/SiO₂=0.01–1.0
M/SiO₂=0.01–2.0
R'/SiO₂=0.05–1.5.

21. A reaction mixture according to claim 18 wherein said mixture has a composition, expressed in terms of mole ratios, within the following ranges:

SiO₂/Al₂O₃=60–5,000
H₂O/SiO₂=20–60
OH⁻/SiO₂=0.1–0.5
M/SiO₂=0.05–1.0
R'/SiO₂=0.1–0.6.

* * * * *